US009812162B2

(12) United States Patent
Luo

(10) Patent No.: US 9,812,162 B2
(45) Date of Patent: Nov. 7, 2017

(54) OPENING AND CLOSING DEVICE OF ROTATING CAGE TYPE JUKEBOX DISC TRAY

(71) Applicant: AMETHYSTUM STORAGE TECHNOLOGY CO., LTD., Guangdong (CN)

(72) Inventor: Tiewei Luo, Guangdong (CN)

(73) Assignee: AMETHYSTUM STORAGE TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 15/508,109

(22) PCT Filed: Feb. 10, 2015

(86) PCT No.: PCT/CN2015/072611
§ 371 (c)(1),
(2) Date: Mar. 2, 2017

(87) PCT Pub. No.: WO2016/033943
PCT Pub. Date: Mar. 10, 2016

(65) Prior Publication Data
US 2017/0287519 A1 Oct. 5, 2017

(30) Foreign Application Priority Data
Sep. 2, 2014 (CN) .......................... 2014 1 0443579

(51) Int. Cl.
*G11B 17/22* (2006.01)
*G11B 33/04* (2006.01)
(Continued)

(52) U.S. Cl.
CPC ........ *G11B 17/226* (2013.01); *G11B 33/0466* (2013.01); *G06F 3/0686* (2013.01); *G11B 17/24* (2013.01)

(58) Field of Classification Search
None
See application file for complete search history.

(56) References Cited

U.S. PATENT DOCUMENTS

| 6,075,758 A * | 6/2000 | Wu | G11B 17/226 |
| | | | 369/30.52 |
| 6,301,204 B1 * | 10/2001 | Yamada | G11B 17/225 |
| | | | 369/34.01 |

(Continued)

FOREIGN PATENT DOCUMENTS

| CN | 1410988 | 4/2003 |
| CN | 101740064 | 6/2010 |
| CN | 104217735 | 12/2014 |

OTHER PUBLICATIONS

"International Search Report (Form PCT/ISA/210)", dated May 28, 2015, with English translation thereof, pp. 1-4.

*Primary Examiner* — Will J Klimowicz
(74) *Attorney, Agent, or Firm* — JCIPRNET

(57) ABSTRACT

An opening and closing device comprises a disc tray, a mounting shaft and a jukebox manipulator. The disc tray is mounted on the mounting shaft. A positioning structure is provided between the disc tray and the mounting shaft. The mounting shaft is mounted on an outer circumference of a jukebox rotating cage. The jukebox manipulator is mounted on a manipulator driving unit. A side of the manipulator driving unit is provided with an optical drive, the jukebox manipulator is provided with a driving plate structure and the disc tray is provided with a driving lever. When the jukebox rotating cage rotates, the disc tray can revolve around the rotating shaft of jukebox rotating cage and can rotate around the mounting shaft. With the assistance of in-place bumping post which is provided by a side of the jukebox rotating cage, the positioning structure can locate the rotation of disc tray at a fixed static angle.

10 Claims, 3 Drawing Sheets

(51) Int. Cl.
  *G11B 17/24* (2006.01)
  *G06F 3/06* (2006.01)

(56) References Cited

U.S. PATENT DOCUMENTS

| | | | |
|---|---|---|---|
| 6,373,796 B1* | 4/2002 | Herring | G11B 17/28 369/36.01 |
| 8,385,163 B2 | 2/2013 | Goyal et al. | |
| 2005/0024996 A1* | 2/2005 | Schumacher | G11B 17/26 369/30.33 |
| 2008/0278839 A1* | 11/2008 | Barkley | G11B 15/6835 360/71 |
| 2008/0282275 A1* | 11/2008 | Zaczek | G11B 17/225 720/632 |

\* cited by examiner

OPENING AND CLOSING DEVICE OF ROTATING CAGE TYPE JUKEBOX DISC TRAY

CROSS-REFERENCE TO RELATED APPLICATION

This application is a 371 application of an International PCT application serial no. PCT/CN2015/072611, filed on Feb. 10, 2015, which claims the priority benefits of China Application No. 201410443579.9, filed on Sep. 2, 2014. The entirety of each of the above-mentioned patent applications is hereby incorporated by reference herein and made a part of this specification.

TECHNICAL FIELD

The present invention belongs to an application field of technology of optical mass storage device, specifically to an opening and closing device of rotating cage type jukebox disc tray (or known as disc cartridge), and belongs to an innovative technology of opening and closing device of rotating cage type jukebox disc tray.

BACKGROUND

The technology of optical storage, as a solution of cold data storage, with several unique and privileged technical characteristics compared with the technologies of magnetic storage and semi-conductor storage, is widely used in fields such as data backup, archiving storage and secure storage.

As the coming of big data era, greater requirements for a store management mode of massive discs is put forward by the rapid expansion of data scale, large-scale clustering and distribution of optical storage system: requirement for a huge amount of managed discs; requirement for higher automatically; requirement for greater density; requirement for faster data transmission speed.

Therefore, with regard to the above requirements, plenty of design and development of new technology has been made to various products of jukebox, and specifically the appearance of rotating cage type jukebox has solved a series of issues such as much manual intervention to jukebox, large dispersion of disc in the process of store management of massive discs, low accuracy of each absolute physical storage location, slow reaction speed and difficult integrated management of complete automation.

SUMMARY OF THE INVENTION

An object of the invention is in consideration of above-mentioned issues, to provide an opening and closing device of rotating cage type jukebox disc tray with increased opening and closing speed as well as enhanced positional accuracy. The invention can be easily operated and conveniently used.

A technical solution of the invention: an opening and closing device of rotating cage type jukebox disc tray according to the invention, comprises a disc tray, a mounting shaft and a jukebox manipulator. In particular, one end of the disc tray is mounted on the mounting shaft, and a mating surface between the disc tray and the mounting shaft is provided with a positioning structure. The other end of the disc tray carries a disc. The mounting shaft is mounted on an outer circumference of a jukebox rotating cage and is parallel to a rotating shaft of the jukebox rotating cage. The jukebox manipulator is mounted on a manipulator driving unit of which a moving direction is parallel to a geometric axis of the rotating shaft. A side of the manipulator driving unit is provided with an optical drive, the jukebox manipulator is provided with a driving plate structure and the disc tray is provided with a driving lever. When the jukebox rotating cage rotates in a given direction, the driving plate structure on the jukebox manipulator can stop the driving lever on a targeted disc tray, enabling the disc tray to revolve around the rotating shaft of jukebox rotating cage and meanwhile enabling the disc tray to rotate around the mounting shaft. A side of the jukebox rotating cage is provided with an in-place bumping post and a return bumping post. With the assistance of in-place bumping post, the positioning structure provided by the mating surface between the disc tray and the mounting shaft can locate a rotation of disc tray at a fixed static angle.

There are essential differences between the invention and the traditional drawer type opening and closing mode. Compared with the traditional drawer type jukebox structure, the invention which increases the opening and closing speed and enhances the positional accuracy, provides a solution of taking and storing discs which enable to open and close the disc box quickly with high accuracy for a jukebox design of optical storage field with high density. It is an opening and closing device of rotating cage type jukebox disc tray with clever design, high performances and practical convenience.

DETAILED DESCRIPTION OF THE PREFERRED EMBODIMENT

Embodiment

Figure 1:
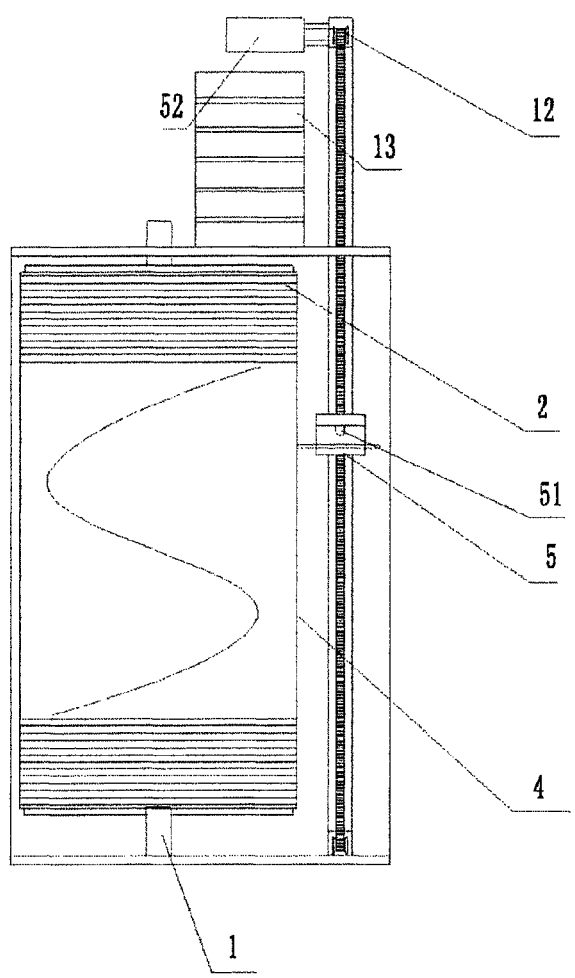
FIG. 1 illustrates a structural schematic of the invention.
Figure 2:
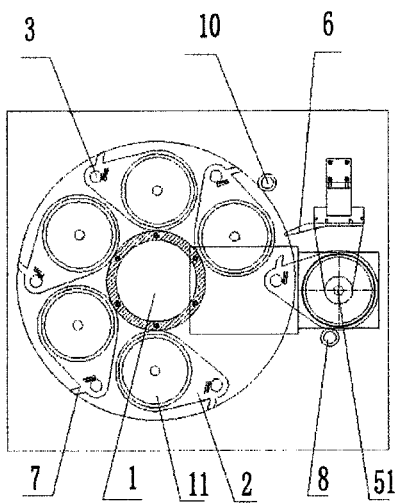
FIG. 2 illustrates a structural schematic plan of the invention.
Figure 3:
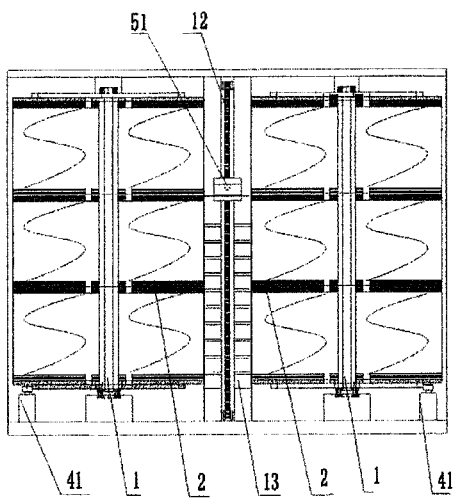
FIG. 3 illustrates a structural schematic of a double-rotating cage type solution of the invention.
Figure 4:
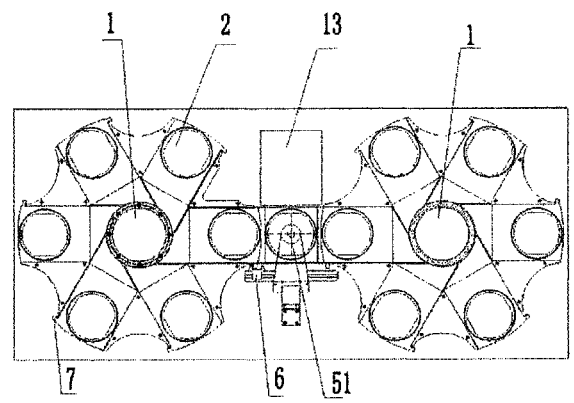
FIG. 4 illustrates a structural schematic plan of a double-rotating cage type solution of the invention.
Figure 5:
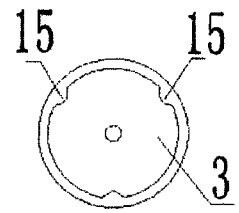
FIG. 5 illustrates a schematic of a mounting shaft of the invention.
Figure 6:
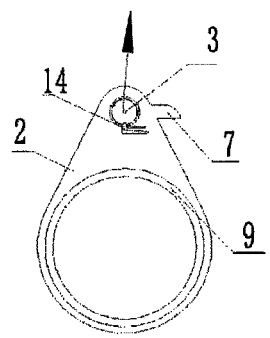
FIG. 6 illustrates a schematic of a disc tray of the invention.

A structural schematic of the invention is shown as FIG. 1. An opening and closing device of rotating cage type jukebox disc tray of the invention, comprises a disc tray 2, a mounting shaft 3 and a jukebox manipulator 5. In particular, one end of the disc tray 2 is mounted on the mounting shaft 3, and a mating surface between the disc tray 2 and the mounting shaft 3 is provided with a positioning structure. The other end of the disc tray 2 carries a disc 11. The mounting shaft 3 is mounted on an outer circumference of a jukebox rotating cage 4 and is parallel to a rotating shaft 1 of the jukebox rotating cage 4. The jukebox manipulator 5 is mounted on a manipulator driving unit 12 of which a moving direction is parallel to a geometric axis of the rotating shaft 1. A side of the manipulator driving unit 12 is provided with an optical drive 13, and the optical drive 13 may be arranged by a side of the manipulator driving unit 12, being located at the top of jukebox rotating cage 4 or at the bottom of jukebox rotating cage 4. The jukebox manipulator 5 is provided with a driving plate structure 6 and the disc tray 2 is provided with a driving lever 7. When the jukebox rotating cage 4 rotates in a given direction, the driving plate structure 6 on the jukebox manipulator 5 can stop the driving lever 7 on a targeted disc tray, enabling the disc tray 2 to revolve around the rotating shaft 1 of jukebox rotating cage 4 and meanwhile enabling the disc tray 2 to rotate around the mounting shaft 3. A side of the jukebox rotating cage 4 is provided with an in-place bumping post 8 and a return bumping post 10. With the assistance of in-place bumping post 8, the positioning structure provided by the mating surface between the disc tray 2 and the mounting shaft 3 can locate a rotation of disc tray 2 at a fixed static angle. The above-mentioned optical drive 13 may be arranged outside the jukebox rotating cage 4 and also may be arranged above the jukebox rotating cage 4, but the optical drive 13 must be close to the manipulator driving unit 12, enabling the manipulator driving unit 12 to drive the jukebox manipulator 5 to move. The jukebox manipulator 5 can send the disc 11 on the disc tray 12 to the optical drive 13.

In this embodiment, the manipulator driving unit 12 is a synchronous belt drive mechanism, comprising a synchronous belt and a synchronous belt wheel. In this embodiment, the above-mentioned disc tray 2 can carry one disc, or can be placed with a plurality of discs, for example, can carry 12 pieces with a thickness of more than 1.2 mm.

In this embodiment, when the above-mentioned disc tray 2 rotates around the mounting shaft 3, the disc tray 2 drive the disc 11 to be carried to move out of the circumference of the rotating cage.

In this embodiment, the above-mentioned positioning structure provided at the mating surface between the disc tray 2 and the mounting shaft 3 comprises at least one positioning groove 14 arranged on the mounting shaft 3, and the disc tray 2 is provided with at least one elastically expandable positioning salient point 15 on a circular ring which is in a matching assembly with the mounting shaft 3. The above-mentioned positioning salient point 15 can be stuck in the positioning groove 14 to realize positioning. When the disc tray 2 rotates around the mounting shaft 3 to a suitable position, the above-mentioned positioning groove 14 and the positioning salient point 15 can be perfectly united to form a rotation static angle positioning with a damping which can be separated only when exerting a greater moment of force on it. An elasticity force of the expandable positioning salient point 15 may come from a righting moment of deformation of materials, and also may come from a moment of force provided by a suitable spring. Or the above-mentioned positioning salient point 15 is made on the mounting shaft and the above-mentioned positioning groove 14 is made on the circular ring, which is provided on the disc tray 2 and in the matching assembly with the mounting shaft 3. The effects are equivalent. The positioning structure can locate the rotation of disc tray 2 at a fixed static angle. If the jukebox rotating cage 4 rotates in a reverse direction at the moment, the opened disc tray 2 will be pushed back inside the jukebox rotating cage 4 by the stop of return bumping post 10. By this time, the positioning structure provided between the disc tray 2 and the mounting shaft 3 can locate the disc tray 2 inside the jukebox rotating cage 4 back to the original static angle. When the jukebox rotating cage 4 rotates in a given direction (designed clockwise in FIG. 1), the driving plate structure 6 on the jukebox manipulator 5 will stop the driving lever 7 on the targeted disc tray 2, enabling the targeted disc tray 2 to revolve around the shaft of jukebox rotating cage 4 and meanwhile enabling the targeted disc tray 2 to rotate around the mounting shaft 3. Such movement can rotate the targeted disc 11 in the targeted disc tray 2 out of the circumference of the whole jukebox rotating cage 4. Meanwhile, with the assistance of in-place bumping post 8 provided by the side of jukebox rotating cage 4, the positioning structure provided between the disc tray 2 and the mounting shaft 3 can locate the rotation of targeted disc tray 2 at a fixed static angle. If the jukebox rotating cage 4 rotates in a reverse direction at the moment, the opened targeted disc tray 2 will be pushed back inside the jukebox rotating cage 4 by the stop of return bumping post 10 provided by the side of jukebox rotating cage 4. By this time, the positioning structure provided between the disc tray 2 and the mounting shaft 3 can locate the targeted disc tray 2 which has returned inside the jukebox rotating cage 4, back to the original static angle.

In this embodiment, the above-mentioned disc 11 is carried in a slot 9 provided on the disc tray 2.

In this embodiment, the above-mentioned mounting shaft 3 is a rather long shaft structure which is shared by a plurality of disc trays 2. Or each disc tray 2 possesses one mounting shaft, a plurality of mounting shafts are assembled vertically in stack-up along a same axis and the positioning groove 14 of each layer on the mounting shaft 3 is overlapped at a same angle.

In this embodiment, the positioning groove 14 provided on the above-mentioned mounting shaft 3 is a U-shape groove and the elastically expandable positioning salient point 15 provided on the disc tray 2 is formed integrally with the disc tray 2.

In this embodiment, the above-mentioned jukebox rotating cage 4 is driven by a rotating cage driving motor 41 which can drive the jukebox rotating cage 4 to rotate by a gear drive mechanism. The gear drive mechanism may be a reduction gear drive mechanism.

In this embodiment, the above-mentioned manipulator driving unit 12 is driven by a manipulator driving motor 52 which drives the manipulator driving unit 12 to move, and the manipulator driving unit 12 drives the jukebox manipulator 5 to move upward and downward.

In this embodiment, the above-mentioned jukebox manipulator 5 is further provided with a disc pick-and-place finger 51.

In this embodiment, the disc tray (or known as a disc cartridge) of the invention can be made from plastic materials such as PC and ABS or from other suitable materials. The design principle of the opening/closing structure of the invention is that in a mode of single-shaft rotation, the mounting shaft 3 which is mounted on the outer circumference of jukebox rotating cage and is parallel to the rotating shaft 1 of jukebox rotating cage, serves as an axis of rotation. One end of the disc tray 2 is mounted on the mounting shaft 3 and the other end carries a disc. When the rotating cage rotates in a given direction (designed clockwise in FIG. 1), the driving plate structure 6 on the jukebox manipulator 5 will stop the driving lever 7 on the targeted disc tray 2, enabling the disc tray 2 to revolve around the shaft of rotating cage and meanwhile enabling the disc tray 2 to rotate around the mounting shaft 3. Such movement may rotate the targeted disc in the disc tray 2 out of the circumference of the whole jukebox rotating cage 4 (as in FIG. 1). Meanwhile, with the assistance of in-place bumping post 8 provided by the side of jukebox rotating cage 4, by means of the positioning structure which is provided between the disc tray 2 and the mounting shaft 3 locating the rotation of targeted disc tray at a fixed static angle, the "opening" movement of targeted disc tray is accomplished. After the targeted disc tray 2 being opened and the disc pick-and-place finger 51 finishing the pick-and-place movement of the targeted disc, the jukebox rotating cage 4 rotates in a reverse direction rather than the previous direction, and the opened targeted disc tray 2 will be pushed back inside the jukebox rotating cage 4 by the stop of return bumping post 10 provided by the side of jukebox rotating cage 4. Meanwhile, by means of the positioning structure which is provided between the disc tray 2 and the mounting shaft 3 locating the returned targeted disc tray back to the original static angle, the "closing" movement of targeted disc tray is accomplished.

What is claimed:

1. An opening and closing device of rotating cage type jukebox disc tray, comprising a disc tray, a mounting shaft and a jukebox manipulator, wherein one end of the disc tray is mounted on the mounting shaft, a mating surface between the disc tray and the mounting shaft is provided with a positioning structure, and the other end of the disc tray carries a disc; the mounting shaft is mounted on an outer circumference of a jukebox rotating cage and is parallel to a rotating shaft of the jukebox rotating cage, the jukebox manipulator is mounted on a manipulator driving unit of which a moving direction is parallel to a geometric axis of the rotating shaft; a side of the manipulator driving unit is provided with an optical drive, the jukebox manipulator is provided with a driving plate structure and the disc tray is provided with a driving lever; when the jukebox rotating cage rotates in a given direction, the driving plate structure on the jukebox manipulator can stop the driving lever on a targeted disc tray, enabling the disc tray to revolve around the rotating shaft of jukebox rotating cage and meanwhile enabling the disc tray to rotate around the mounting shaft; a side of the jukebox rotating cage is provided with an in-place bumping post and a return bumping post; and with the assistance of in-place bumping post, the positioning structure provided at the mating surface between the disc tray and the mounting shaft can locate a rotation of disc tray at a fixed static angle.

2. The opening and closing device of rotating cage type jukebox disc tray according to claim 1, wherein the disc tray can carry one disc, or can be placed with a plurality of discs.

3. The opening and closing device of rotating cage type jukebox disc tray according to claim 1, wherein the positioning structure provided at the mating surface between the disc tray and the mounting shaft comprises at least one positioning groove arranged on the mounting shaft, the disc tray is provided with at least one elastically expandable positioning salient point on a circular ring which is in a matching assembly with the mounting shaft, and the positioning salient point can be stuck in the positioning groove to realize positioning.

4. The opening and closing device of rotating cage type jukebox disc tray according to claim 3, wherein the positioning salient point is made on the mounting shaft and the positioning groove is made on the circular ring, which is provided on the disc tray and in the matching assembly with the mounting shaft.

5. The opening and closing device of rotating cage type jukebox disc tray according to claim 3, wherein the positioning groove provided on the mounting shaft is a U-shape groove and the elastically expandable positioning salient point provided on the disc tray is formed integrally with the disc tray.

6. The opening and closing device of rotating cage type jukebox disc tray according to claim 3, wherein the mounting shaft is a rather long shaft structure which is shared by a plurality of disc trays, or each disc tray possesses one mounting shaft, a plurality of mounting shafts being assembled vertically in stack-up along a same axis and the positioning groove of each layer on the mounting shaft being overlapped at a same angle.

7. The opening and closing device of rotating cage type jukebox disc tray according to claim 6, wherein the jukebox rotating cage is driven by a rotating cage driving motor.

8. The opening and closing device of rotating cage type jukebox disc tray according to claim 6, wherein the manipulator driving unit is driven by a manipulator driving motor.

9. The opening and closing device of rotating cage type jukebox disc tray according to claim 6, wherein the jukebox manipulator is further provided with a disc pick-and-place finger.

10. The opening and closing device of rotating cage type jukebox disc tray according to claim 1, wherein the disc is carried in a slot provided on the disc tray.

* * * * *